March 26, 1946.  R. O. BURGESS ET AL  2,397,125
PELORUS
Filed Dec. 22, 1941   2 Sheets-Sheet 1

INVENTORS
Robert O. Burgess &
BY Edward C. Craig
ATTORNEY

March 26, 1946.   R. O. BURGESS ET AL   2,397,125
PELORUS
Filed Dec. 22, 1941   2 Sheets-Sheet 2
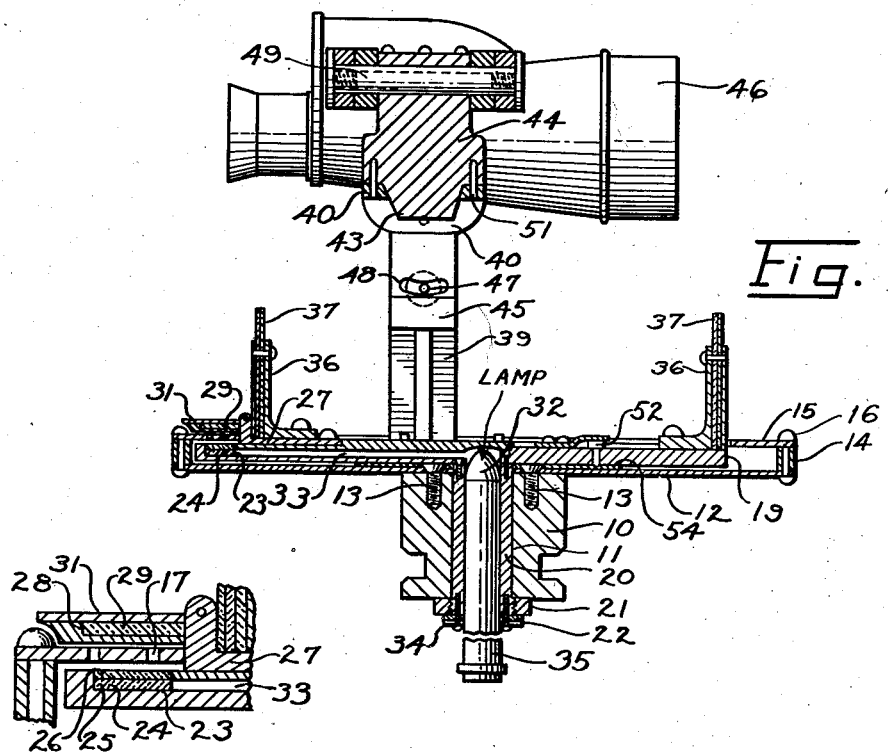
Fig. 3
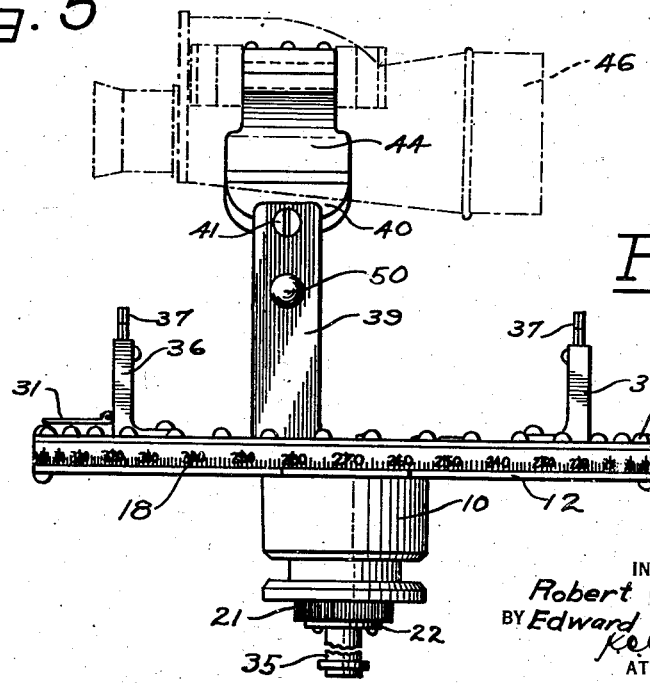
Fig. 5
Fig. 4
INVENTORS
Robert O. Burgess &
BY Edward C. Craig
ATTORNEY Patented Mar. 26, 1946

2,397,125

UNITED STATES PATENT OFFICE 2,397,125

PELORUS

Robert O. Burgess, Arlington, Va., and Edward C. Craig, United States Navy

Application December 22, 1941, Serial No. 423,960

6 Claims. (Cl. 33—72)

(Granted under the act of March 3, 1883, as amended April 30, 1928; 370 O. G. 757)

This invention relates to instruments for measuring horizontal angles, and it has a particular relation to a pelorus used on shipboard for determining the angle between a line of sight and the longitudinal axis of the vessel.

One of the objects of the present invention is the provision of a pelorus of the character described which embodies a dial or compass card having stencil indicia and a self-luminous screen of relatively short extent located beneath the dial and movable with the sighting means of the instrument to at times illuminate selected indicia of the dial with a minimum of light dispersion.

Another object of the invention is the provision of a pelorus in which electric illumination may be substituted for the self-luminous means when necessary or desired without displaying an undesired amount of light.

Still another object of the invention is the provision of a pelorus adapted to be mounted on the deck of a vessel and adapted to be connected in a suitable manner with the data computer located remote therefrom and employed in automatically setting the gyro directing instrumentalities of a torpedo.

A further object of the invention is the provision of a pelorus equipped with night sighting means and audible means for indicating the angle of sight when the vessel is operating under blackout conditions.

With these and other objects in view, as well as other advantages that may be incident to the use of the improvements, the invention consists in the parts and combinations thereof hereinafter set forth and claimed, with the understanding that the several necessary elements constituting the same may be varied in proportion and arrangement without departing from the nature and scope of the invention, as defined in the appended claims.

In order to make the invention more clearly understood, there are shown in the accompanying drawings, means for carrying the invention into practical use, without limiting the improvements in their useful application to the particular construction, which, for the purpose of explanation, have been made the subject of illustration.

In the accompanying drawings:

Fig. 3 is a vertical sectional view taken on line 3—3 of Fig. 2;

Fig. 4 is a side elevational view of the structure shown in Fig. 2; and

Fig. 5 is an enlarged fragmentary longitudinal sectional view of the luminous screen portion of the alidade.

Figure 1:
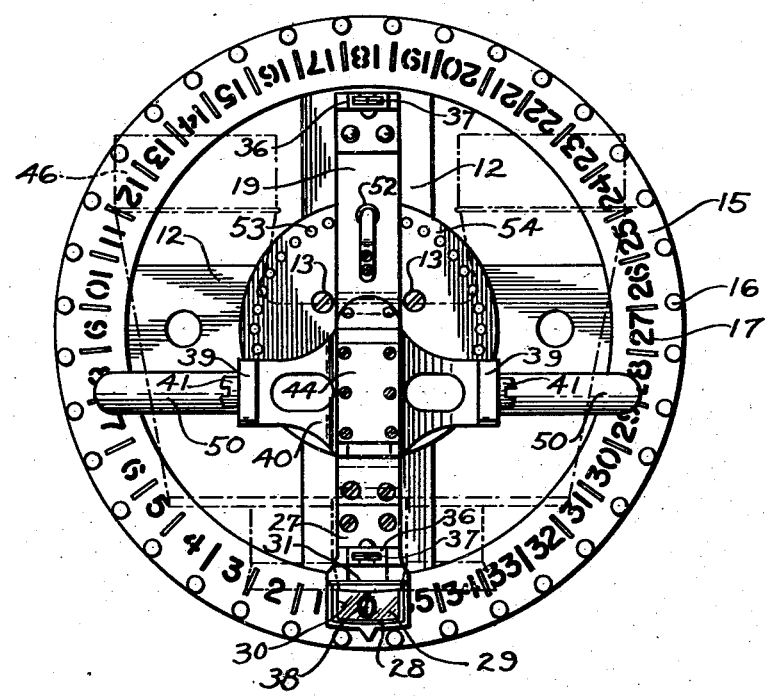
Fig. 1 is a plan view of a pelorus constructed in accordance with the invention.
Figure 2:
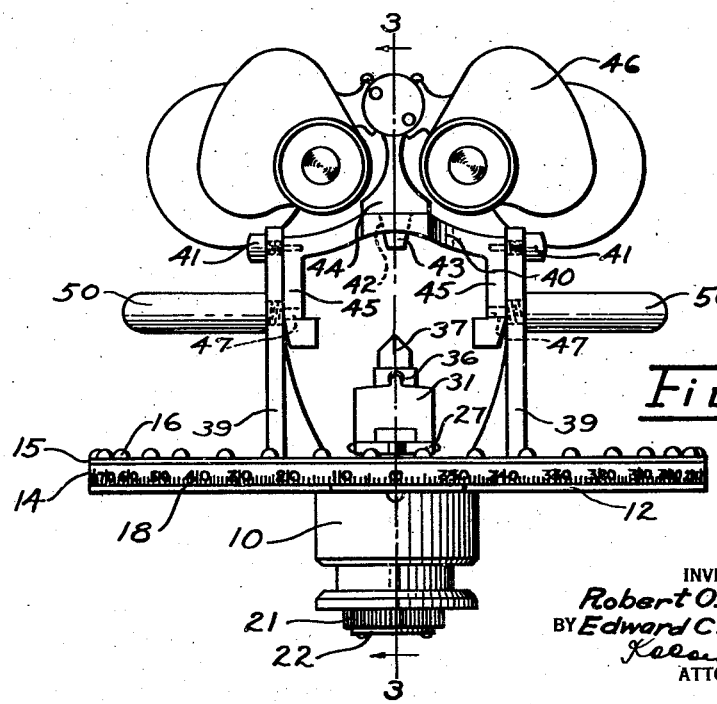
Fig. 2 is an elevational view of the structure shown in Fig. 1 with the sighting binoculars in position thereon.

Referring to the drawings, a pelorus embodying the invention is shown as comprising a central hub 10 adapted to be mounted in a machine gun socket on the bridge rail of a submarine and is formed with an axial bore 11 (Fig. 3). A spider 12 is secured to the upper end of the hub 10 by screws 13 and forms the support for a spacing ring 14 and an annular dial 15 which are secured together by round headed rivets 16. These rivets are spaced ten degrees apart so that they may be located in the dark by sense of touch, and correspond in location to ten degree markings 17 stencilled in the dial 15. The outer circumferential surface of the spacing ring 14 may also be graduated if so desired, as indicated at 18.

Cooperating with the dial 15 is an alidade 19 in the form of a diametrically extended bar secured at its middle to a sleeve 20 which is rotatably mounted in the bore 11 of the hub 10 and which is held against displacement therefrom by a retaining nut 21 having a knurled circumferential surface, and a lock washer 22 secured to the sleeve. One end of the alidade 19 extends beneath the dial ring 15 and is provided with a recess 23 for receiving a self-luminous capsule 24, the light from which passes upwardly through the stencilled indicia 17 beneath which the capsule may, at the time, be positioned. This capsule comprises a lower receptacle 25 of transparent thermo-plastic material for containing the self-luminous body and an upper cover 26 of similar transparent material united therewith and sealed around their edges. A bracket 27 is fixed to the alidade in overhanging relation to the dial ring 15 and capsule 24 and is formed with a rectangular opening 28 having a transparent plastic member 29 seated therein forming a window through which the illuminated indicia of the dial may be observed. The transparent member 29 is provided with a lubber line 30 for cooperation with the dial 15. A cover plate 31 is hinged to the bracket 27 in order that the window 30 may be closed to obscure all illumination when the instrument is not actually being read but which may be opened momentarily when it may become necessary to make a reading.

The indicia of the dial ring may be illuminated independently of the self-luminous capsule 24 when so desired by means of an electric lamp 32 of the flashlight type, which may be inserted in the sleeve 20. The light from the lamp is transmitted through a passageway 33 formed in the alidade 19 and through the transparent cover plate 26 of the capsule and the stencilled indicia 17 of the dial. The lamp 32 is held in position by a collar 34 secured to the battery container 35 of the lamp and to the sleeve 20.

The alidade 19 also carries fore and aft sighting devices each comprising a bracket 36 having a transparent pointer 37 mounted for vertical adjustment therein. These pointers are constructed generally similarly to the capsule 24, in that they embody two transparent plastic plates housing a self-luminous tubular capsule forming a lubber line 38.

Mounted on or cast integrally with the alidade 19 intermediate its ends and movable therewith is a pair of vertically extending spaced brackets 39 between the upper ends of which a binocular rest or carriage 40 is pivotally mounted, as at 41, for tilting movement about a transverse horizontal axis. This rest is provided with a tapered opening 42 intermediate its ends for receiving a wedge shaped lug 43 formed on a binocular holder or cradle 44 and with depending counterweighted arms 45 for balancing the weight of a pair of binoculars 46. The tilting movement of the rest 40 is limited by means of pins 47 fixed in the brackets 39 and extending into arcuate slots 48 formed in the arms 45. These binoculars are pivotally mounted on a pin 49 journalled in the holder 44 for tilting movement about a longitudinally extending axis. The alidade 19 and parts carried thereby may be turned about its vertical axis in order to sight the instrument, by means of handles 50 fixed to the brackets 39. Thus, it will be seen that this pivotal movement of the holder 44 and the pivotal movement of the rest 40 provide a universal mounting for the binoculars 46 such as will permit a sight to be held on a target or other object notwithstanding the pitch and roll of the vessel. A pair of vertically extending pins 51 are preferably provided on the rest 40 for engagement with registering openings formed in the holder 44. This construction insures a firm mounting for the binoculars when in use and yet permits of the quick removal of the same when the submarine submerges, the remainder of the pelorus structure remaining in place during submerged activities. This affords an instrument ready for immediate use upon surfacing.

The touch system provided by the round headed rivets 16 for determining the angle of the alidade in the dark is supplemented by an audible system provided by a spring pressed detent 52 carried by the alidade for engagement with a series of circularly arranged drill holes or notches 53 provided in a disc 54 secured to the spider 12.

The rotatable parts of the hereinabove described instrument which include the sleeve 20 and nut 21 may be connected beneath the bridge rail with suitable electrical means, such as a self-synchronous motor system, with the data computer located at the torpedo directing station within the hull.

From the foregoing it will be apparent that a very simple and sturdy pelorus is provided which may efficiently be employed at night without the display of an unnecessary and undesired amount of light, which may be held on a line of sight with accuracy and which may be used to transmit its angular position automatically to a torpedo station.

By means of the type of illumination hereinabove described the fire control officer may observe and read the instrument with a minimum of effect upon the eye focus such as may undesirably affect or impair his vision in total darkness.

It will be understood that the above description and accompanying drawings comprehend only the general and preferred embodiment of the invention, and that various changes in construction, proportion and arrangement of the parts may be made within the scope of the appended claims without sacrificing any of the advantages of the invention.

The invention described herein may be manufactured and used by or for the Government of the United States of America for governmental purposes without the payment of any royalties thereon or therefor.

Having thus set forth and disclosed the nature of this invention, what is claimed is:

1. A pelorus for use in determining the angle defined by the intersection of a line of sight with the fore and aft axis of a vessel, comprising a stationary dial plate having stencil apertures therethrough defining dial indicia of relatively large extent, an alidade mounted on one side of said dial plate for rotation thereabout, sighting means carried by said alidade, a self-luminous screen of relatively small extent carried by and movable with said alidade on the other side of said dial plate for illuminating selected indicia, a transparent window carried by said alidade and having a lubber line thereon for cooperation with the illuminated indicia, and a closure member for said window adapted to be opened or closed to selectively render visible or to obscure from view the illuminated indicia of said dial plate.

2. A pelorus for use in determining the angle defined by the intersection of a line of sight with the fore and aft axis of a vessel, comprising a stationary dial ring having stencil apertures therethrough defining dial indicia of relatively large extent, an alidade mounted for rotation above said dial ring and having one end thereof extending beneath said dial ring and having a recess therein, sighting means carried by said alidade, a self-luminous capsule disposed within the recess in said alidade and beneath said dial ring for illuminating selected indicia, a transparent window carried by said alidade and having a lubber line thereon for cooperation with the illuminated indicia, and a closure member for said window adapted to be opened and closed to selectively render visible or to obscure from view the illuminated indicia of said dial plate.

3. A pelorus for use in determining the angle defined by the intersection of a line of sight with the fore and aft axis of a vessel, comprising a stationary dial plate having stencil apertures therethrough defining dial indicia of relatively large extent, an alidade mounted for rotation above said dial plate, sighting means carried by said alidade, a self-luminous screen of relatively small extent carried by said alidade beneath said dial plate for illuminating selected indicia, a transparent window carried by said alidade and having a lubber line thereon for cooperation with the illuminated indicia, a closure member for said window adapted to be opened or closed to selectively render visible or to obscure from view the illuminated indicia of said dial plate, and audible means for indicating said angle when said indicia is obscured.

4. A pelorus for use in determining the angle defined by the intersection of a line of sight with the fore and aft axis of a vessel, comprising a stationary dial plate having stencil apertures therethrough defining dial indicia of relatively large extent, an alidade mounted for rotation above said dial plate, sighting means carried by said alidade, a self-luminous screen of relatively small extent carried by said alidade beneath said dial plate for illuminating selected indicia, a transparent window carried by said alidade and having a lubber line thereon for cooperation with the illuminated indicia, a closure member for said window adapted to be opened or closed to selectively render visible or to obscure from view the illuminated indicia of said dial plate, and means for indicating said angle by sense of touch when said indicia are obscured.

5. A pelorus for use in determining the angle defined by the intersection of a line of sight with the fore and aft axis of a vessel, comprising a stationary dial plate having stencil apertures therethrough defining dial indicia of relatively large extent, an alidade mounted for rotation above said dial plate, a self-luminous screen of relatively small extent carried by said alidade beneath said dial plate for illuminating selected indicia, a transparent window carried by said alidade and having a lubber line thereon for cooperation with the illuminated indicia, a closure member for said window adapted to be opened and closed to selectively render visible or to obscure from view the illuminated indicia of said dial plate, a bracket fixed to said alidade, and an optical instrument mounted on said bracket for pivotal movement about horizontally disposed transversely extending axes for orienting said indicating means.

6. A pelorus for use in determining the angle defined by the intersection of a line of sight with the fore and aft axis of a vessel, comprising a hub portion adapted to be mounted on the rail of a vessel and having an axial bore therein, a support fixed to said hub, a dial fixed to said support and having stencilled indicia therein, an alidade pivotally mounted in said hub for rotation above said dial and having a recess formed in one end thereof beneath said dial for containing a self-luminous capsule and a radial passageway establishing communication between said recess and the bore in said hub, and sighting means carried by said alidade, said bore being adapted to receive an electric lamp for transmitting light through said passageway to said recess and thence through said stencilled indicia independently of said self-luminous capsule, said capsule and said lamp being selectively employed to illuminate said stencilled indicia.

ROBERT O. BURGESS.
EDWARD C. CRAIG.